United States Patent [19]

Dower

[11] 4,099,536
[45] Jul. 11, 1978

[54] METHOD AND APPARATUS FOR CONTROLLING A SURGING FLOW IN A CLOSED CONDUIT

[75] Inventor: Ethell J. Dower, Houston, Tex.

[73] Assignee: Warren Automatic Tool Co., Houston, Tex.

[21] Appl. No.: 707,230

[22] Filed: Jul. 21, 1976

[51] Int. Cl.² .................... G05D 7/00; G05D 16/00
[52] U.S. Cl. .................................. 137/2; 137/487; 137/499
[58] Field of Search ............... 137/2, 8, 14, 85, 86, 137/486, 487, 499

[56] References Cited

U.S. PATENT DOCUMENTS

| | | | |
|---|---|---|---|
| 2,633,858 | 4/1953 | Eckman | 137/86 |
| 2,834,363 | 5/1958 | Pessen | 137/86 X |
| 2,851,049 | 9/1958 | DuBois | 137/86 |
| 2,923,307 | 2/1960 | Grogan | 137/86 |

*Primary Examiner*—Alan Cohan
*Attorney, Agent, or Firm*—Arnold, White & Durkee

[57] ABSTRACT

An apparatus and method for controlling a surging flow in a closed conduit is characterized by a moveable flow restrictor element disposed within the closed conduit and responsive to a control signal to restrict the fluid flow therewithin to a damped flow rate. The control signal is generated by a controller element which responds to first and second signals input thereto. The first signal is representative of the instantaneous fluid flow rate within the closed conduit. The second signal is functionally related to the first signal and representative of the damped flow rate within the conduit.

19 Claims, 13 Drawing Figures

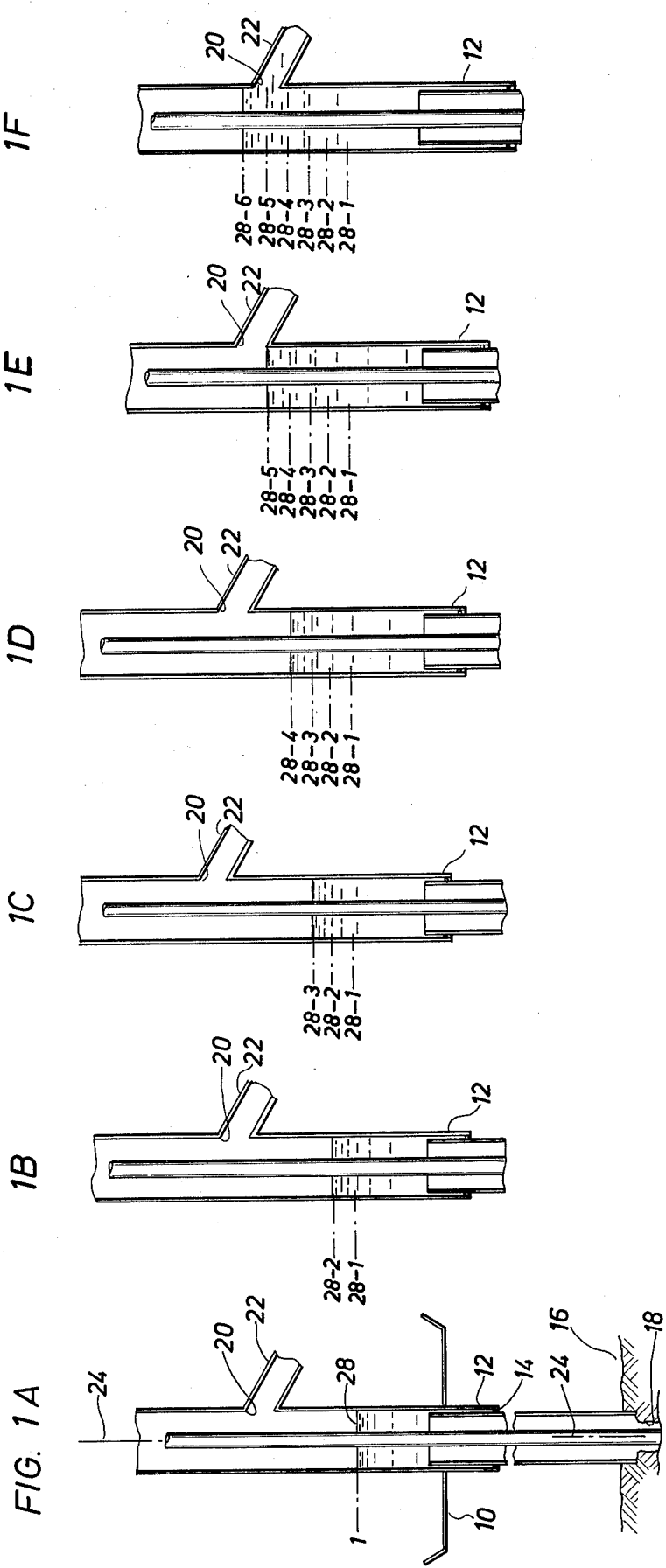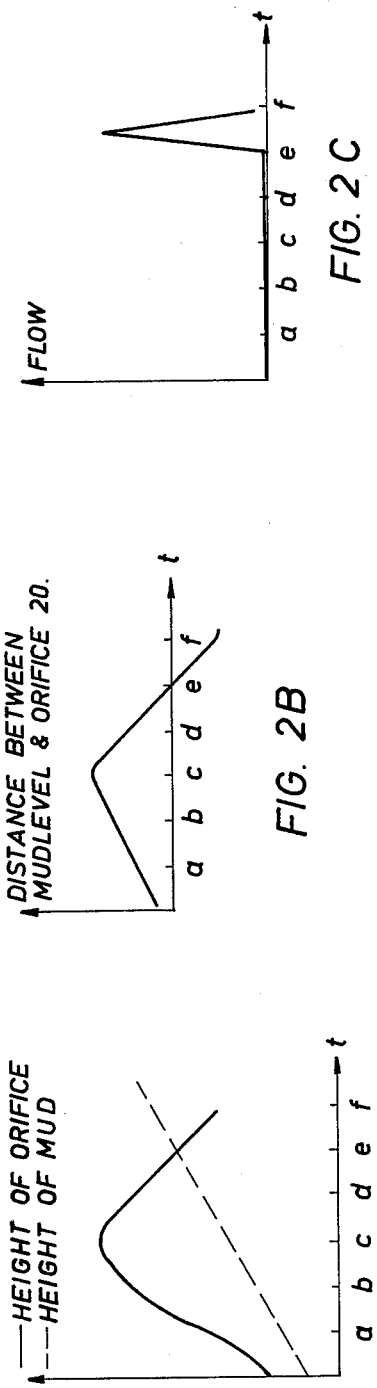

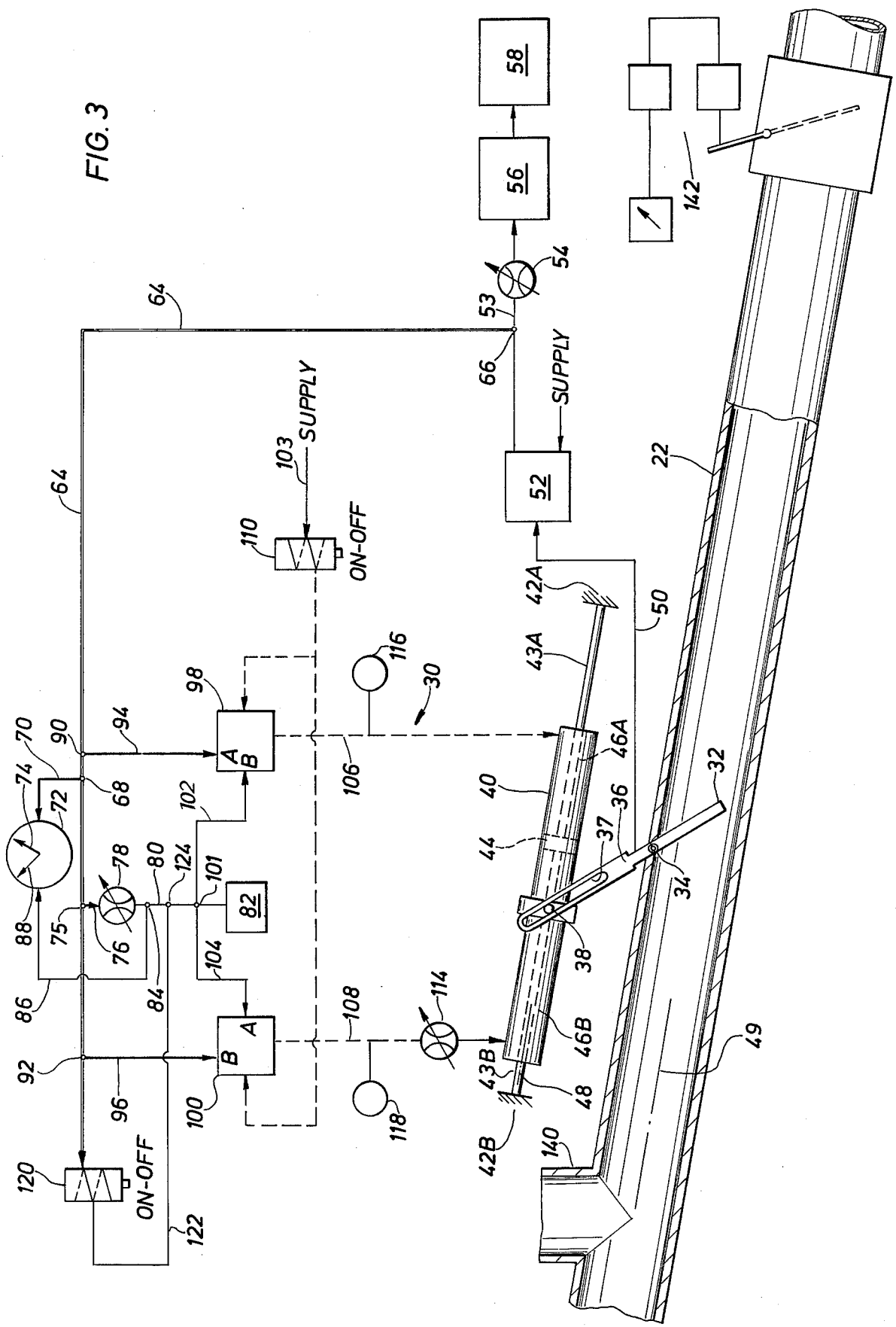

METHOD AND APPARATUS FOR CONTROLLING A SURGING FLOW IN A CLOSED CONDUIT

BACKGROUND OF THE INVENTION

1. Field of the Invention

This invention relates to a fluid flow meter and, in particular, to a fluid flow meter for controlling and metering surge flows within a closed conduit.

2. Description of the Prior Art

During the oil drilling process it is vitally necessary for the drilling operators to accurately ascertain and monitor the flow rates of drilling fluid into and out of the well bore. The optimum drilling situation occurs when the flow of well fluid into the bore is equal to the fluid outflow therefrom. However, if the fluid outflow of the bore is greater than the flow into a well, it is an indication that the bore is in communication with a source of fluid other than that fluid being introduced from the surface through the drill string. Also, the input fluid pressure is not sufficient to maintain the integrity of the formation. Alternatively, if the fluid outflow from the bore is less than the amount of fluid entering the bore, it is an indication that fluid is being lost into the formation. Loss of drilling fluid into the formation is deleterious to the formation and further drilling is precluded if the amount of fluid loss becomes excessive.

It is a simple enough matter to monitor the flow rate of well fluid entering the bore. This is usually done by monitoring the pump flow rate at which the fluid is pumped from a storage reservoir into the well. The well outflow rate, on the other hand, is more difficult to monitor. Normally, an inclined pipe is provided adjacent the well bore and fluid emanating from the bore is impelled by gravity toward a settling vat and storage reservoir. The art provides within this inclined outflow pipe a metering device known as a FLO-SHO, manufactured and sold under that name by the assignee of the present invention.

A FLO-SHO is a device directly attachable to the inclined outflow pipe. The device includes a flapper-type valve plug member moveably disposed across the diameter of the outflow pipe and extending through an opening provided therein. The flapper is pivotably arranged for angular movement about an axis of rotation, the axis being conveniently disposed within the FLO-SHO casing. An adjustable bias spring imparts a predetermined load to the flapper. The magnitude of the angular displacement of the flapper within the pipe is functionally related to the flow of well fluid passing through the pipe and generating the flapper displacement. A pneumatic transducer is arranged and calibrated with the flapper to provide a pneumatic signal indicative of the displacement of the flapper (and therefore, the flow rate through the outlet pipe) to an associated display apparatus and recorder. In land-based operations, the FLO-SHO admirably monitors the outflow rate of well fluid. The flow of fluid in the inclined outflow pipe is usually relatively steady and the action of the flapper partially restricting the flow channel generates a slight backup immediately upstream thereof to insure that a continuous reading of the fluid outflow rate is provided.

The problem becomes more difficult, however, when attempting to monitor the outflow fluid flow rate of an offshore floating drilling installation. In such an installation a telescoping riser pipe extends downwardly through the bottom of a floating drilling rig to provide an outer casement for the drilling elements between the ocean floor and the floating rig.

Normally the rig is anchored so that it is maintained above the hole being generated in the ocean floor. That is, the drilling rig is fixedly maintained in place along the substantially planar ocean surface. However, due to the variable fluctuations of the ocean surface, the rig rises and falls in response to the swells of the open sea. The telescoping relationship of segments of the riser pipe accommodates any displacements in a direction perpendicular to the planar surface of the ocean and maintains the integrity of the riser pipe. Within the rig itself, an inclined outflow pipe is connected to the riser pipe.

The rising and falling of the drilling rig in response to the wave swells generates a difficult problem in accurately measuring the outflow fluid flow rate. The problem may be appreciated by envisioning the condition when the drill rig is in the trough of an ocean swell. At this point in time, relative to a fixed datum extending from the ocean floor, the connection of the inclined outflow conduit to the riser pipe is separated from the rising level of well fluid by a given distance. The well fluid is rising within the riser pipe at a steady outflow rate. But for the motion of the rig, the fluid level would reach the outflow pipe in a predetermined length of time.

However, as the rig rises in response to the crest of the wave, it may be appreciated that despite the constant climb rate of the outflow fluid relative to the fixed datum, the distance between the top of the rising column of well fluid and the orifice of the outflow pipe increases. Thus, a situation is generated repetitively wherein no outflow fluid is passed through the inclined outflow pipe for an extended period of time, and then for a succeeding period of time, a great surge of outflow fluid enters the inclined pipe. A conventional flow measurement device would therefore indicate a zero flow rate for a predetermined portion of a repetitive cycle, and then a surging flow rate for the remaining portion of the cycle. Such readings from a FLO-SHO connected in the outflow line are of little help when attempting to determine changes in the average outflow rate of well fluid on a floating rig.

The situation has become such that weather conditions dictate the accuracy of the well fluid outflow measurements in the outflow pipe. On a calm day, with little cresting of the waves, the surge problem is not meaningful. However, on days where large swells appear, the problem of accurate outflow monitoring has not been solved by the prior art.

The inability of the prior art to solve the surge flow problem centers around the failure of prior art devices to maintain backlog of well fluid immediately upstream of the FLO-SHO flapper. Thus, the prior art fails to maintain a continuous, if not constant, flow through the flapper. Attempts have been made to modify the spring bias of the conventional FLO-SHO apparatus in order to more forcefully resist movement of the flapper in response to the surge so as to maintain a greater backlog of fluid. Another expedient has been to provide a shock absorber or cushioning device to slow the response of the flapper to the surge in an attempt to generate a sufficient backlog to maintain a constant flow through the FLO-SHO during those periods of time when no outflow fluid is surging into the pipe. However, both these attempts have proved ineffective.

Of course, inserting a fixed flow orifice within the pipe would provide a sufficient backflow to maintain a flow through a FLO-SHO meter disposed downstream of the orifice between the occurrence of surges. However, this expedient places too severe a restriction within the outflow conduit to meet the requirements of the operators. Further, such a flow restrictor requires that the outflow pipe extend for a distance from the riser pipe to the storage vat greater than the distance available within the floating drilling installion. If this is not done, the backlog generated may be so large as to prevent the well fluid outflow from a previous surge to be drained from the conduit to an extent sufficient to accommodate the succeeding surge outflow. Even with a relatively high bell nipple arrangement the possibility of fluid overflow remains.

It is advantageous, therefore, to provide a meter arrangement to control flow surges and to create a continuous, if not constant, flow through the meter so that an accurate representation of the well fluid outflow rate may be ascertained, despite the presence of flow surges. It is also advantageous to provide an arrangement upstream of a meter device to control surges introduced into a closed conduit from a casing riser to thereby generate a continuous flow through the meter. It is advantageous to provide a meter arrangement to generate a rapid indication of outflow rate by restricting the fluid flow so as to provide a sufficient backlog upstream of the flow measuring device to maintain a continuous flow therethrough. Yet, at the same time, it is advantageous to provide a meter which can adjust the magnitude of the restriction so as not to cause overflow of the bell nipple.

It is advantageous to provide a flow meter able to exert an active, dynamic positive force to actually move a flow restrictor against a surge flow to create the fluid backlog. It is also of advantage to provide a meter which varies the magnitude of the active force to generate a nearly steady rate of flow through the meter and yet permit drainage of the accumulated backlog so as to prevent overflow of fluid from the physically limited outflow conduit.

SUMMARY OF THE INVENTION

This invention relates to a method and apparatus for controlling a surging fluid flow in a closed conduit. The apparatus includes first signal generating means for generating a first signal representative of the instantaneous flow rate of a fluid within the closed conduit. Second signal generating means is operatively associated with the first signal generating means and generates a second signal functionally related to the first signal, the second signal being representative of the damped flow rate of the fluid within the closed conduit. The second signal is, in practice, a time base average of the first signal, the time rate of change of the damped signal being adjustably controllable. Control means for generating a suitable control signal in response to the first and second signals are provided. A flow restrictor is disposed within the closed conduit and responds to the control signal to actively more against and restrict the fluid flow within the closed conduit so as to pass therethrough a flow rate substantially equal to the damped flow rate. The flow restrictor operates in response to the control signal to generate a fluid backlog upstream thereof. Selective positioning of the flow restrictor within the closed conduit in response to the control signal drains the backlog generated to provide a continuous flow through the restrictor. The rate of flow through the restrictor may be monitored by a suitable metering device operatively associated with the first signal generating means or the rate of flow may be monitored by a separate metering device. Also provided are means in fluid communication with the closed conduit and upstream of the flow rrestrictor for accommodating the backlog generated thereby without substantially increasing the hydrostatic head therein.

BRIEF DESCRIPTION OF THE DRAWINGS

The invention will be more fully understood from the following detailed description of the preferred embodiment, taken in connection with the accompanying drawings, in which:

FIGS. 1A-1F are a series of diagrams illustrating the nature of the problem of monitoring well fluid outflow on a floating drilling rig;

FIGS. 2A-2C are graphical representations of the flow conditions illustrated diagrammatically in FIGS. 1A-1F;

FIG. 3 is a diagrammatic and schematic illustration of a flow meter embodying the teachings of the invention; and, FIGS. 4A-4C are diagrammatic illustrations indicating the operation of a flow meter embodying the teachings of this invention.

DESCRIPTION OF THE PREFERRED EMBODIMENT

Figure 4A:
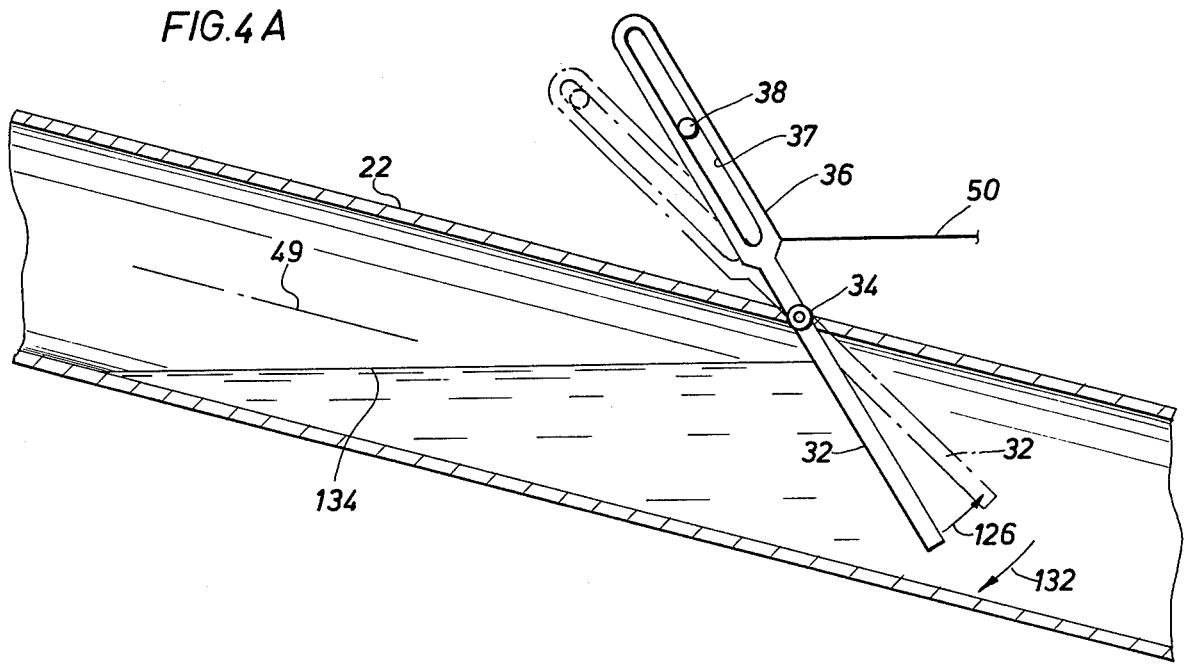

Throughout the following description similar reference numerals refer to similar elements in all figures of the drawings.

When drilling for oil in an offshore location, the response of the floating drill ship to the ocean swells generates a problem in monitoring accurately the outflow of well fluid. Reference to FIG. 1 indicates diagrammatically the nature of the problem.

As seen, a floating drill rig, indicated generally by numeral 10, provides a riser pipe 12 having at least one telescoped joint 14. Through the riser pipe or slip joint 12, communication from the rig 10 to the ocean floor 16 is maintained. Suitable anchor means maintain the rig 10 generally above the bore 18 being generated in the ocean floor 16. The provision of the telescoped joint 14 in the riser pipe 12 accommodates the rise and fall of the drill rig 10 in response to the ocean swells.

Within the rig 10 the riser pipe 12 is connected through an orifice 20 to an inclined flow pipe 22 leading to mud recycling pits (not shown) for filtering and recirculation of well mud. The response of the riser pipe 12 to the ocean swells raises and lowers the elevation of the orifice 20 with respect to the upper level of the well fluid within the riser pipe. This is accurately illustrated by the series of diagrams shown in FIGS. 1A through 1F.

When the rig 10 is in the trough of a swell, the height of the fluid in the riser pipe 12 is indicated with regard to a fixed datum 24 (for example, an axis extending from the ocean floor through the riser pipe 16) by reference numeral 28. The well fluid riser relative to the fixed datum 24 at a constant rate as illustrated in FIG. 2A, which is a graphical depiction of the height of the orifice 20 and the height of the well fluid within the riser pipe 12 plotted against time. As the drill ship 10 rises in response to the presence of ocean swells, the distance between the orifice 20 and the constantly advancing well fluid level 28 increases, as shown in FIGS. 1A through 1C, and graphically illustrated in FIG. 2B. FIG. 1D and FIG. 2A indicate that, as the swell abates, the orifice 20 drops and the distance between the height 28 of the well fluid and the orifice 20 decreases (FIG. 2B). As shown in FIGS. 1E and 2A, intersection of the orifice 20 with the rising level of well fluid initiates a surge of well fluid through the orifice 20 into the outflow pipe 22. FIG. 2C graphically depicts the relationship between outflow in the pipe 22 plotted against time and indicates that for a prolonged period of time during each swell cycle (that is, during the time response of the drill rig 10 to the crests and troughs of the waves) no flow is carried in the outflow pipe 22 for a predetermined portion of each cycle followed by a large surge flow during the later portion of the cycle.

The situation depicted in FIGS. 1 and 2 may be quantified to indicate the magnitude of the outflow measurement problem as the rig 10, responding to the ocean swells, raises and lowers the outflow orifice 20 relative to the height 28 of the well fluid. A typical circulation rate (input) of 400 gallons per minute (GPM) of drilling mud is associated with a 21-inch diameter riser pipe operating in the condition of a 10-foot swell at an 8-second period. The rig and outflow line rises from the bottom of the trough at a much faster rate than the mud rises inside the riser pipe from the circulation rate (FIGS. 1A through 1C, FIG. 2A). In approximately the first half of the period the rig rises 10 feet while the mud rises only about 1.5 feet, both measured relative to the fixed datum. Hence, there is no outflow within the pipe 22. As the rig descends and the mud continues to rise in the riser pipe, the two levels meet in another 2.5 seconds (FIG. 1D through 1F, FIGS. 2A and 2B). The mud has now risen about 2.5 feet and this 2.5 feet of well mud is emptied from the riser pipe 12 into the flow pipe 22 during the final 1.5 seconds of the 8-second period. This means there is 6.5 seconds (FIG. 2C) of a no-flow condition followed by a surge of 53 gallons in a 1.5-second interval. The flow rate during the surge is therefore about 2100 GPM; which, when averaged with the relatively long zero flow period, is equivalent to the input circulation rate of 400 GPM.

Referring now to FIG. 3, a diagrammatic and schematic illustration of a fluid flow metering apparatus 30 embodying the teachings of this invention is illustrated as disposed within an inclined fluid outflow pipe 22. The apparatus 30 includes flow restrictor means, such as a flapper element 32, positionable within the conduit 22 and pivotally mounted about a pivot rod 34. The flow restricting flapper 32 is responsive to a control signal to restrict a surging fluid flow within the conduit to a flow rate substantially equal to a time-based average of an instantaneous surge flow rate. An extension 36 is affixed to the flapper 32 and has a slot 37 in which is received a drive pin 38 mounted on the exterior of a double acting cylinder 40. A suitable double acting cylinder is the "CD-type" manufactured by Allen Air Corporation of Mineola, New York.

Mounted within the cylinder 40 and secured to end walls 42A and 42B of the flow meter apparatus by support rods 43A and 43B is a piston 44. The piston 44 divides the interior of the cylinder 40 into first and second regions 46A and 46B. It may be appreciated by reference to FIGS. 3 and 4 that the slot 37 in the extension 36 cooperates with the drive pin 38 to translate angular motion of the flapper 32 to a rectilinear motion along the axis 48 of the double acting cylinder 40 to vary the regions 46A and 46B in proportion to the magnitude of the angular deflection of the flapper 32 about its pivot point 34. The axis 48 of the double acting cylinder 40 is preferably disposed parallel to an axis 49 of the conduit 22.

The flapper 34 is calibrated in a manner well known to those skilled in the art and mechanically connected by a linkage 50 to a pneumatic position indicator unit 52. The unit 52 produces a pneumatic output signal functionally related to the instantaneous flow through the flapper 32. This output signal, in the range of 3 to 15 PSI, is communicated by the line 53 through a variable restrictor 54 and into a standard FLO-SHO indicator 56 and recorder 58. It is appreciated that the restrictor 54 comprises damping means for damping the signal representative of the instantaneous flow rate in the conduit 22 while the standard FLO-SHO indicator 56 comprises means associated with the signal damping means (restrictor 56) responsive to the damped signal to indicate the magnitude thereof. Thus, in a manner known to those in the art, indication as to the instantaneous rate of flow through the flapper 32 is provided by the magnitude of the pneumatic signal carried by the line 53.

According to the teachings of this invention, a pneumatic line 64 is connected to the line 53 at a connection 66. The line 64, therefore, communicates a pneumatic signal which is functionally related to the instantaneous flow through the flapper 32. For clarity, all lines within the Figures which carry pneumatic signals functionally related to the instantaneous flow through the flapper 32, such as the line 64, are indicated as bold lines. A portion of the output signal from the indicator 52 is also communicated by the lines 64 and 70 to one side of a dual indicator gauge 72. Thus, one of the needle indicators 74 on the face of the gauge 72 is representative of the instantaneous flow past the flapper 32. A suitable gauge is that obtainable from Moore Products of Spring House, Pennsylvania, under identification number 10601-7.

As shown in FIG. 3, the instantaneous signal line 64 is connected at a node 75 by a line 76 to a variable restrictor 78. The outlet of the restrictor 78 to connected by a line 80 to a flow chamber 82. The chamber 82 acts in a manner known to those skilled in the art to dampen and delay the pneumatic signal presented to it. The variable restrictor 78 and flow chamber 82 comprise means for generating a second signal functionally related to the first, instantaneous, signal. The second signal is representative of a damped flow rate of fluid within the closed conduit 22. Thus, on the line 80 and all lines connected therefrom, a second pneumatic signal functionally related to the first pneumatic signal is conducted to various locations within the pneumatic circuitry. In the Figures, to distinguish the dampened from the instantaneous signal, the dampened signal lines are indicated in fine lines. It is appreciated that the second, damped signal is a time based average of the first signal and that the restrictor 78 comprises means for adjusting the time rate of change of the second damped signal.

The line 80 is connected at a node 84 by a line 86 to the second side of the dual indicator guage 72. Thus, the second needle 88 of the guage 72 is representative of the dampened signal resulting from the chamber 82.

The instantaneous signal line 64 is connected, as at nodes 90 and 92, and by lines 94 and 96, to first and second fluid relays 98 and 100, respectively. Suitable relays include the "GC-671A" relay manufactured by Moore Products Co., of Spring House, Pennsylvania. Also connected to the relays 98 and 100, as at a node 101, and by lines 102 and 104, is the dampened signal line 80. The instantaneous and damped signals are respectively connected to opposite ports A and B of the relays 98 and 100, as seen in FIG. 3. It is appreciated that the relays 98 and 100 comprise means responsive to the instantaneous and damped signals for generating a control signal which selectively positions the restrictor element (the flapper 32) within the conduit 22. When energized, as is discussed more fully herein, the relays 98 and 100 permit fluid passage from a 25 PSI fluid supply 103 to either of lines 106 or 108, depending upon the respective relay 98 or 100 which is energized. The lines 106 and 108 communicate with the regions 46A and 46B of the double acting cylinder 40, respectively. It is appreciated that the relays 98 and 100, both responsive to the instantaneous and damped signals, comprise means for generating a control signal to operatively control the position of the flow restrictor within the conduit. The supply connections are shown in dashed lines, to distinguish from the instantaneous and dampened signals.

A suitable switch 110, such as that manufactured by Clippard Instrument Laboratory, Inc. of Cincinnati, Ohio, and sold under the trademark CLIPPARD MINIMATIC, manufacturer's number MJTV-3, is connected within the supply line as seen in FIG. 3 and comprises means for actuating the control signal generating means, the relays 98 and 100. The line 108 has a variable restrictor 114 connected therein for the purpose of damping the action of cylinder 40 and resulting flapper position signal transmitted back to the relays by way of the lines 64, 94, and 96 sufficiently enough to prevent spontaneous or continued oscillation. Gauges 116 and 118, such as those manufactured by United States Gauge of Sellersville, Pa., under manufacturer's number P846U, are respectely tied to the lines 106 and 108.

A second switch 120, similar to the switch 110, is connected to the instantaneous signal line 64 and to a line 122 taken from the dampened signal line 80 as at the node 124. The purpose of the switch 120 is to equalize the damped and instantaneous signals, and thus neutralize the two relays 98 and 100.

The relays 98 and 100 are operable as follows: When the pneumatic signal presented to the "A" input exceeds the pneumatic signal presented to the "B" input by a predetermined amount, one relay partially opens and permits fluid at a pressure less than the supply pressure to pass to the appropriate outlet line. As the difference between the the signals at the "A" and "B" inputs increases, the relay opens fully to permit full supply pressure to pass. As the difference between the pneumatic signals decreases, the previously opened relay closes. As the signal at the "B" input begins to exceed the "A" input, the other relay partially opens and continues to as the difference between signals increases, until the full supply pressure passes through this relay. Due to the complimentary connection of the relays 98 and 100, depending upon the magnitude of the input signal differences, fluid outflow from the supply 103 is carried by the line 106 or 108 to the regions 46A or 46B, respectively.

Figure 4C:
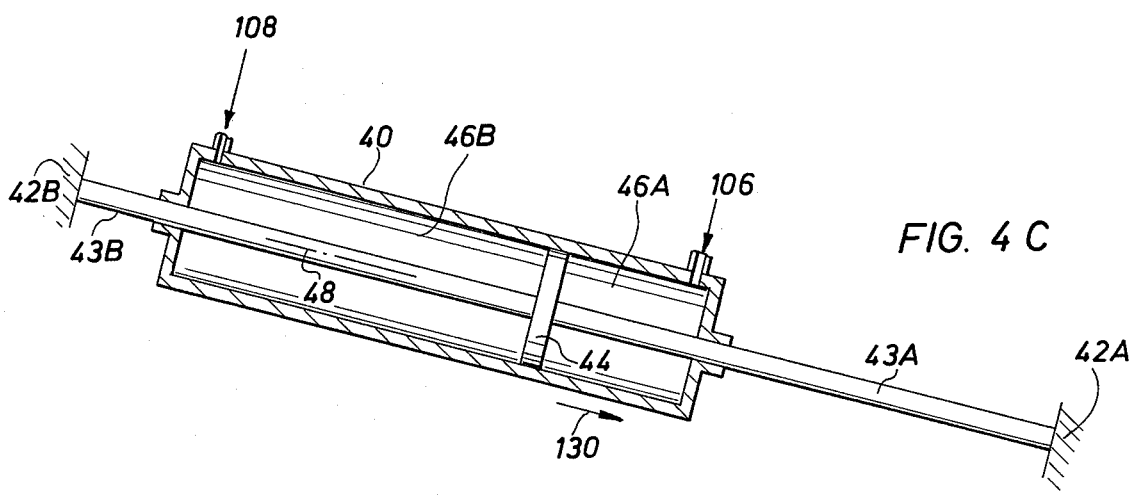
Figure 4B:
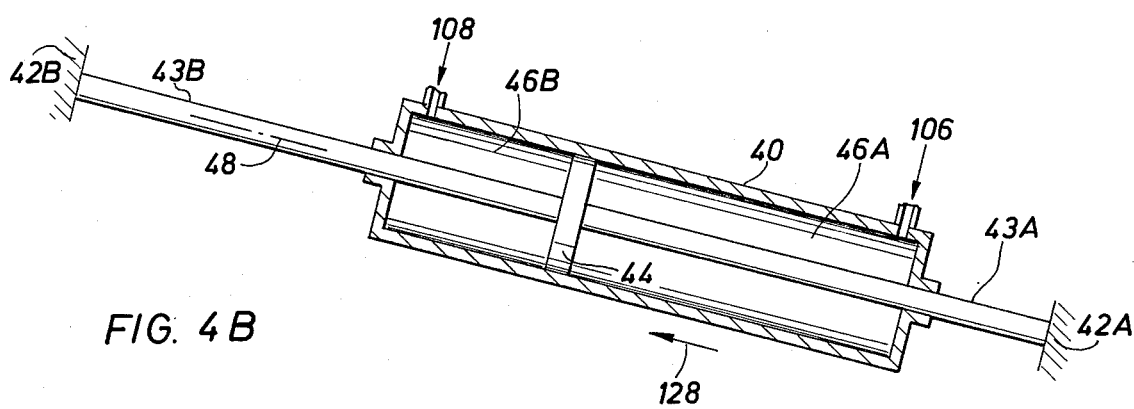

In operation, with reference to FIG. 4A, it may be seen that when the flapper 32 occupies the first position within the outflow pipe 22 indicated by solid lines, the cylinder 40 occupies a position relative to the piston 44 so as to define the regions 46A and 46B of relative magnitudes, as shown in FIG. 4C. In response to an initial surge through the outflow pipe 22, the flapper 32 deflects a predetermined angular distance about the pivot 34 in the direction indicated by reference arrow 126 to occupy the position within the pipe 22 shown by the dashed lines. As a result of the initial movement of the flapper 32 from the first (solid) to the second (dashed) positions, it is appreciated that a force is transmitted through the drive pin 38 to cause a rectilinear displacement of the cylinder 40 with respect to the piston 44 in the direction 128, as shown in FIG. 4B.

When a surge occurs, the instantaneous output of the position indicator 52 provides a relatively high signal on the output line 53 indicative of a high fluid flow rate. The needle 74 responds to indicate that high rate and signals introduced respectively to the inputs A and B of the relays 98 and 100 are of such a difference in magnitude as to actuate the relay 98 and maintain the relay 100 in the deactuated state. Thus, fluid at the supply pressure is introduced into the region 46A to move the cylinder 40 in the direction indicated by reference arrow 130 (FIG. 4C). The flapper 32 is thus impelled by the active, dynamic force transmitted thereto (through the extension 36 and the pin 38) to move in the angular direction 132 (FIG. 4A) within the conduit 22. The flapper 32, therefore, actively restrains the surge flow to generate a fluid backlog level 134 upstream of the flapper 32. As the backlog drains, a flow rate may be measured by the standard FLO-SHO elements 50, 52, 54, and 56.

However, as the flapper moves in the angular direction 132 to oppose the surge flow, it is apparent that the instantaneous signal indicative of the instantaneous flow rate transmitted through the line 64 begins to decrease. Thus, the damped signal transmitted both to the gauge 72 and to the inputs A and B of the relays 98 and 100 may equal or exceed the instantaneous signal. When the difference between the instantaneous and dampened signals become reversed, that is, the signal to the "B" input exceeds the signal at the "A" input, the relays switch, to introduce fluid to the region 46B and again move the cylinder 40 in the direction indicated by reference arrow 128 (FIG. 4B) and to open the flapper in the angular direction 126 (FIG. 4A). In this manner it may be appreciated that the flapper position is modified within the outlet conduit 22 dependent upon the instantaneous flow rate so as to maintain a fairly constant fluid flow rate through the meter 30.

It is seen that the flapper 32 responds to a control signal on the lines 106 and 108 from the appropriate relay 98 and 100, to be selectively positioned within the conduit 22 so as to generate a fluid backlog upstream of the flapper 32 and to drain that backlog continuously through the flapper 32 to provide an accurate indication of the fluid flow rate. The feedback action of the apparatus therefore permits a continuous fluid flow past the metering flapper that is substantially equal to the time average of the instantaneous surge flow rate. There may be provided, in fluid communication with the closed outflow conduit 22, suitable means for accommodating the fluid backlog created upstream of the flapper 32. For example, a conduit 140 may be provided in such a manner so that excess fluid backlog accommodated therein does not substantially increase the hydrostatic head upstream of the flapper 32.

The relative magnitude and duration of the surges in flow rate is a function of the magnitude of the swell or heave (the vertical displacement of the rig), the period of the swell (from crest to crest) as well as the input circulation rate (the rate of vertical flow up the riser). These factors vary from time to time and the optimum functioning of the apparatus 30 is obtained by varying the restrictor 78. When little or no wave action is present, the restrictor 78 can be opened, or alternatively, the switch 120 set to equalize the signal inputs to the relays 98 and 100. Under severe swell conditions, or unfavorable rig flowline configurations, the actual movement of the cylinder 40 and the flapper 32 necessary to establish a continuous fluid flow therethrough may be so large that the transmitted signal on the line 53 to the indicator meter 56 and recorder 58 cannot be satisfactorily damped by the restrictor 54. In this event, a standard FLO-SHO device or other suitable metering means, indicated at 142, may be disposed within the closed conduit 22 downstream of the flapper 32 for metering the rate of flow of a fluid restricted thereby. In this way, the flapper of the meter 142 serves only to sense and monitor the continuous fluid flow. It is not required to both create a fluid backlog to generate a continuous flow from a surge flow and, at the same time, monitor the flow rate of the continuous flow so created.

What is claimed is:

1. A pneumatic monitoring device for continuously observing the flow rate of a liquid within a closed conduit comprising:
    a flapper disposed within said conduit, said flapper being responsive to flow rate of a liquid therethrough;
    a pneumatic signal generator in communication with said flapper, said pneumatic generator adapted for producing a first pneumatic signal functionally related to the instantaneous flow rate of a liquid through said conduit;
    a damping assembly in communication with said first pneumatic signal and producing a second pneumatic signal functionally related to said first pneumatic signal and representative of a damped liquid flow rate through said conduit;
    a relay assembly in communication with said damping assembly and adapted for receiving said first and second pneumatic signals and producing a pneumatic control signal in response thereto; and,
    a pneumatic positioner adapted for receiving said pneumatic control signal and for positioning said flapper in response thereto.

2. The pneumatic monitoring device of claim 1, wherein said damping assembly comprises a variable flow restrictor and flow chamber, said chamber being in fluid communication with said first pneumatic signal through said flow restrictor.

3. The pneumatic monitoring device of claim 2, wherein said second pneumatic signal is a time base average of said first pneumatic signal.

4. The pneumatic monitoring device of claim 3, wherein the time rate of change of said second pneumatic signal is adjustably controllable by said first restrictor.

5. The pneumatic monitoring device of claim 1, wherein said relay assembly comprises first and second pneumatic relays.

6. The pneumatic monitoring device of claim 5 wherein said first and second pneumatic relays each include a first and second input port,
    said first pneumatic signal being communicated to said first pneumatic relay through said first input port and said damped pneumatic signal being communicated to said first pneumatic relay through said second input port,
    said first pneumatic signal being communicated to said second pneumatic relay through said second input port and said damped pneumatic signal being communicated to said second pneumatic signal through said first input port.

7. The pneumatic monitoring device of claim 1, wherein said pneumatic positioner comprises a piston-cylinder arrangement operatively connected to said flapper and responsive to said control signal to position said flapper in a closed conduit.

8. Apparatus according to claim 7, wherein said flow restrictor generates a fluid backlog upstream thereof, further comprising:
    a reservoir disposed in fluid communication with said closed conduit upstream of said flow restrictor element for storing fluid therein without substantially increasing the hydrostatic pressure within said fluid backlog.

9. Apparatus for monitoring the fluid flow rate of a surging fluid flow in a closed conduit comprising:
    a first signal generator for generating a first signal representative of the instantaneous flow rate of the fluid within the closed conduit;
    a second signal generator for generating a second signal representative of the time-based average of the instantaneous fluid flow rate;
    a control signal generator for generating a control signal functionally related only to the difference between the signal representative of the instantaneous fluid flow rate and the signal representative of the time-based average of the instantaneous fluid flow rate; and
    a flow restrictor movable within the closed conduit in response to the control signal to modify any surging action of the fluid flow within the closed conduit but to permit non-surging changes in the flow rate.

10. Apparatus according to claim 9 further comprising an adjuster element for adjusting, in accordance with the amplitude of the flow surges, the time rate of change of the second signal representative of the time-based average of the instantaneous fluid flow rate.

11. Apparatus according to claim 9 further comprising an indicating meter responsive to one of the signals representative of the fluid flow rate for indicating the magnitude thereof.

12. Apparatus according to claim 9 further comprising a flow measuring device disposed in the conduit with the flow restrictor for generating a signal representative of the magnitude of the fluid flow rate.

13. Apparatus according to claim 9 wherein the flow restrictor is operative to generate the first signal representative of the instantaneous fluid flow rate.

14. Apparatus according to claim 9 wherein the restrictor generates a fluid backlog in the closed conduit upstream thereof as the restrictor moves in response to the control signal and further comprising a reservoir communicating with the closed conduit for accomodating the fluid backlog.

15. Apparatus according to claim 9 wherein the reservoir accomodates the fluid backlog without a substantial increase in hydrostatic pressure within the backlog.

16. A pneumatic monitoring device for observing in a closed conduit the return flow of drilling liquid from an offshore well in the process of being drilled from a floating drilling vessel which heaves in response to the waves of the open sea and causes surges in the liquid flow, comprising:

a flow restrictor movable within the conduit and responsive to the flow rate of the liquid within the conduit;

a first pneumatic signal generator associated with the flow restrictor for generating a first pneumatic signal representative of the instantaneous flow rate of a liquid within the conduit;

a damping assembly communicating with the first pneumatic signal for generating a second pneumatic signal representative of the time-based average of the instantaneous liquid flow rate;

a relay assembly having first and second pneumatic relays therein, the first relay being connected at a first input with the signal representative of the instantaneous liquid flow rate and at a second input with the signal representative of the time-based average of the instantaneous liquid flow rate, the second relay being connected at a first input with the signal representative of the time-based average of the instantaneous liquid flow rate and at a second input with the signal representative of the instantaneous liquid flow rate;

a pneumatic positioner for positioning the flow restrictor within the closed conduit, the positioner including a cylinder divided into first and second regions by a piston, the first region connected to the output of the first relay and the second region connected to the output of the second relay;

the relay assembly being arranged such that when the signal representative of the instantaneous liquid flow rate exceeds the signal representative of the time-based average of the instantaneous liquid flow rate the first relay generates a first pneumatic control signal to the first region of the positioner to move the flow restrictor in a first angular direction to modify the liquid flow rate in the conduit to a flow rate substantially equal to the time-based average of the instantaneous liquid flow rate;

the relay assembly being further arranged such that when the signal representative of the time-based average of the instantaneous liquid flow rate exceeds the signal representative of the instantaneous liquid flow rate the second relay outputs a second pneumatic control signal to the second region of the positioner to move the flow restrictor in a direction opposed to the first angular direction to maintain the liquid flow in the conduit at a flow rate substantially equal to the time-based average of the instantaneous liquid flow rate.

17. A method for monitoring the fluid flow rate of a surging fluid flow in a closed conduit comprising the steps of:

generating a first signal representative of the instantaneous flow rate of the fluid within the closed conduit;

generating a second signal representative of the time-based average of the instantaneous fluid flow rate;

generating a control signal functionally related to the difference between the signal representative of the instantaneous fluid flow rate and the signal representative of the time-based average of the instantaneous fluid flow rate; and, moving a flow restrictor within the conduit only in response to the control signal to modify any surging action of the fluid flow within the closed conduit but to permit non-surging changes in the flow rate.

18. The method of claim 17 further comprising the step of adjusting the time rate of change of the second signal representative of the time-based average of the instantaneous fluid flow rate in accordance with the amplitude of the flow surges.

19. The method according to claim 17 further comprising the step of displaying the magnitude of one of the signals representative of the fluid flow rate.

* * * * *